April 25, 1961 C. E. LOMAX 2,981,801

RESTRICTED SERVICE ARRANGEMENTS

Filed Sept. 15, 1955 7 Sheets-Sheet 1

INVENTOR.
CLARENCE E. LOMAX

BY Mc Walter Owen,

ATTY.

April 25, 1961 C. E. LOMAX 2,981,801

RESTRICTED SERVICE ARRANGEMENTS

Filed Sept. 15, 1955 7 Sheets-Sheet 2

INVENTOR.
CLARENCE E. LOMAX
BY Wm. Walter Owen,
ATTY.

April 25, 1961 C. E. LOMAX 2,981,801

RESTRICTED SERVICE ARRANGEMENTS

Filed Sept. 15, 1955 7 Sheets-Sheet 3

SPECIAL SECOND SELECTOR 300

INVENTOR.

CLARENCE E. LOMAX

BY Mc Watters Owen

ATTY.

REPEATER 400

INVENTOR.
CLARENCE E. LOMAX
BY *Wm. Walter Owen*
ATTY.

RESTRICTED SERVICE ARRANGEMENTS

Filed Sept. 15, 1955 7 Sheets-Sheet 5

REPEATER 500

*INVENTOR.*
CLARENCE E. LOMAX
*BY* [signature]
ATTY.

SELECTOR 600

INVENTOR.
CLARENCE E. LOMAX
BY Wm Walter Owen
ATTY.

April 25, 1961 C. E. LOMAX 2,981,801

RESTRICTED SERVICE ARRANGEMENTS

Filed Sept. 15, 1955 7 Sheets-Sheet 7

INVENTOR.
CLARENCE E. LOMAX
BY [signature]
ATTY.

United States Patent Office 2,981,801

Patented Apr. 25, 1961

2,981,801

RESTRICTED SERVICE ARRANGEMENTS

Clarence E. Lomax, Chicago, Ill., assignor to Automatic Electric Laboratories, Inc., a corporation of Delaware Filed Sept. 15, 1955, Ser. No. 534,471

7 Claims. (Cl. 179—18)

The present invention relates to telephone systems in general, but is more particularly concerned with telephone systems having restricted service facilities.

In my copending application Serial No. 519,083, filed June 30, 1955, now U.S. Patent No. 2,914,616, granted Nov. 24, 1959, there is described a telephone system in which calls made in certain traffic directions are subject to restrictions on a station basis. This is accomplished by providing some substations with a conventional calling device and other substations with a special calling device having an auxiliary, cam-operated contact for momentarily grounding the line conductors near the end of the return movement of the device and incoincidently with the actuation of the impulse springs. A differential relay in a switch giving access to the aforementioned traffic direction either operates or not, dependent upon the presence of this ground pulse, to determine whether or not predetermined restrictions are to be imposed on calls made from the last-mentioned class of substations in these directions. Due to the manner in which the grounding of the line is effected by the special calling device, proper transmission of the digital impulses over the calling loop is not interfered with; yet, since this class-of-service method operates on a station basis, it is possible with this arrangement to assign substations of different service classifications to the same party line.

It is one object of the present invention to provide in a system of the general kind described in my above copending application novel and improved means for imposing such restrictions.

It is another object of my invention to provide means in a selector interposed in the switch train between the calling substation and the numerical switch in which the restriction becomes effective for insuring in the case of a call from a restricted substation the proper transmission of a ground pulse to the last-mentioned switch.

Another object of the invention consists in the provision in an impulse repeater of means for correcting the length of a ground pulse repeated thereby.

In conjunction with the first above-mentioned object, a feature of the invention resides in the use of a normal level selector, which upon receipt of a ground pulse at the end of a series of digital impulses from a restricted substation drops back to the normal level to divert the call to an operator.

Also, in conjunction with the first above-mentioned object, another feature of the invention resides in the use of a normal level selector, in which there are provided means responsive to the receipt over the incoming trunk of a ground pulse for preventing the selector from operating to any level, but for diverting the call immediately over the normal level to an operator.

The invention both as to its organization and method of operation, together with other objects and features thereof, will best be understood by reference to the following specification taken in conjunction with the accompanying drawings.

In the drawings:

Figs. 1 and 2, with Fig. 2 placed to the right of Fig. 1 illustrate the trunking diagram of a telephone system including the features of the present invention. More particularly:

Fig. 1 diagrammatically shows the switching equipment of a suburban and a branch exchange B and C respectively, and a restricted substation T1 and a nonrestricted substation T2 connected to exchange B.

Figure 1:
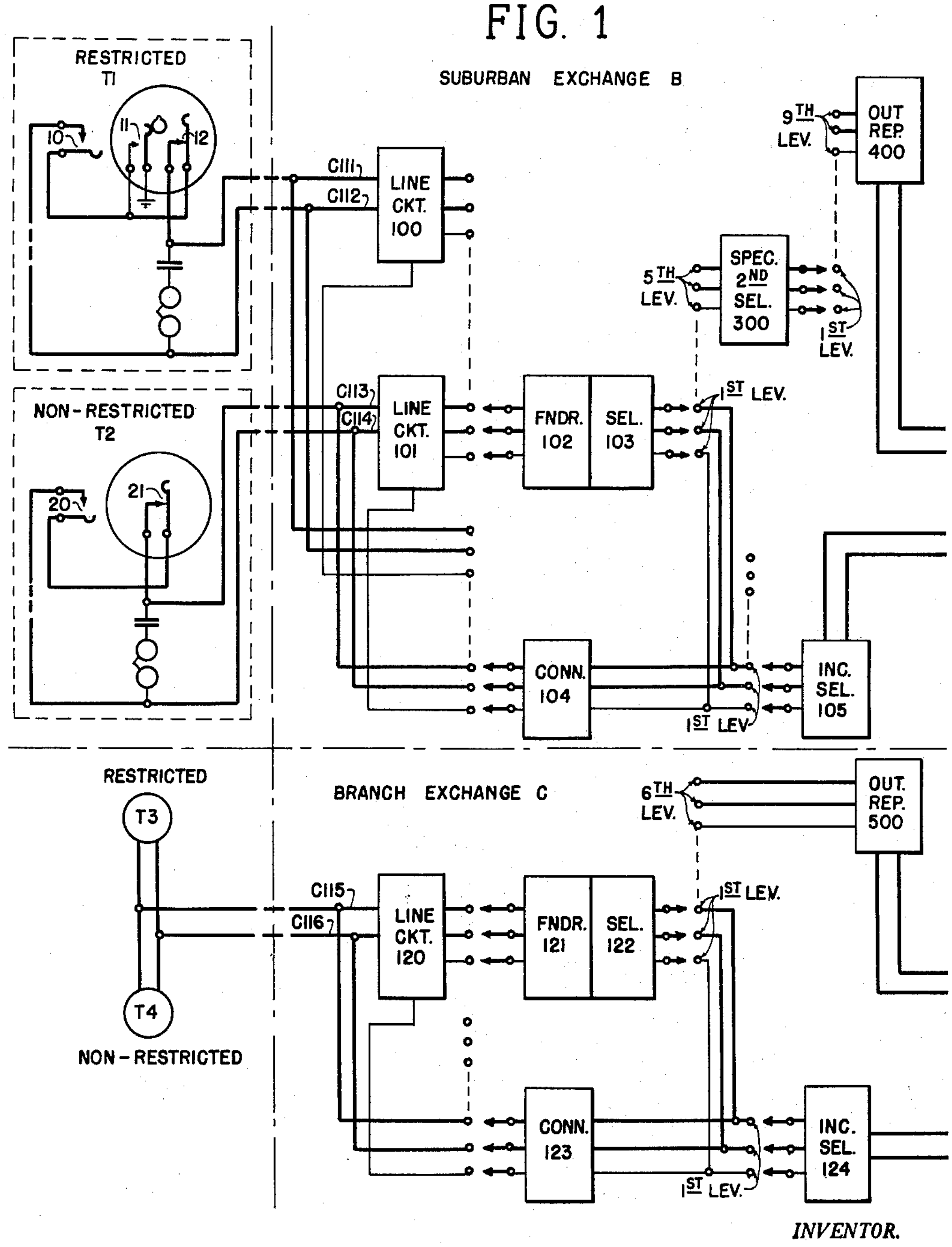

Referring now more particularly to Fig. 1, the exchange B has line circuits 100 and 101 of conventional design. The finder 102, selector 103, the connector 104 and the incoming selector 105 in this exchange also may be of any well-known type, for example, the Strowger type. In connection with these well-known components, reference is made for example, to my U.S. Patent 2,214,908. The circuit details of second selector 300 and of outgoing repeater 400 will be more fully disclosed with reference to Figs. 3 and 4 respectively in the ensuing description. Fig. 1 also shows a pair of substations T1 and T2 which are connected by way of the associated subscriber lines to line circuits 100 and 101 respectively. Substation T2 is of conventional design and has a switch hook contact 20 and a dial with the impulse springs 21. Substation T1 is also of conventional design except that it uses a special type of dial which during its return movement and incoincidently with the opening of the impulse springs, for example, only subsequent to the transmission of the last impulse of a series but prior to its return to normal position, momentarily places ground on the subscriber's line. In Fig. 1, the numeral 12 designates the impulse springs, and numeral 11 the special contact springs of this dial at substation T1 through which ground is thus connected to the line. In conjunction with this special type of dial, reference is made for instance, to U.S. Patent 2,366,647, issued to John E. Ostline on January 2, 1945. The switch hook contact of substation T1 is designated as 10.

Figure 5:
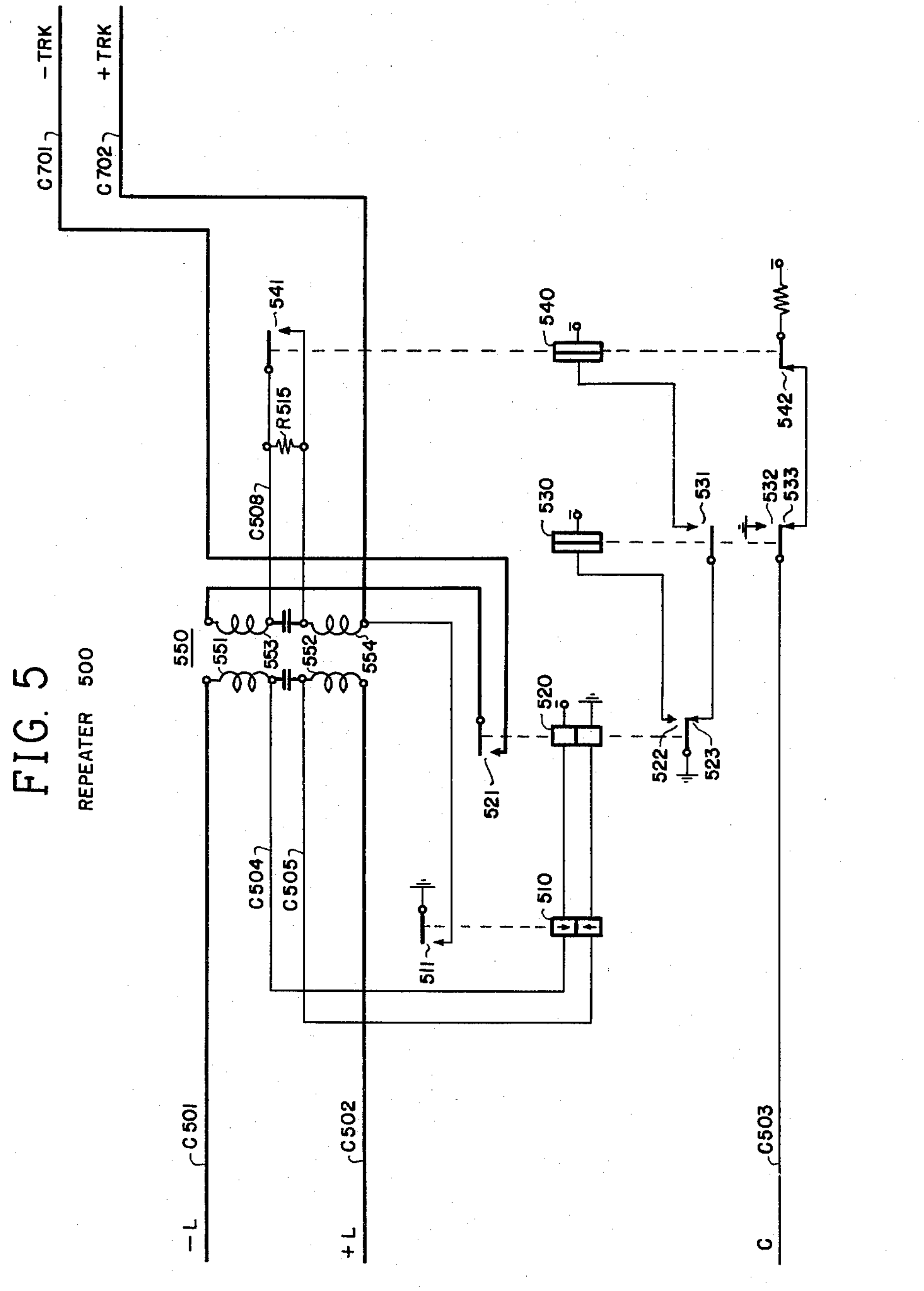
Fig. 5 shows a modified repeater circuit arranged to repeat ground pulses on calls from C to A.

Branch exchange C (Fig. 1) which is assumed to be located in the same metropolitan area includes line circuit 120, line finder 121, selector 122, connector 123 and incoming selector 124; all of these circuits, too, may be of well-known design, reference again being made to my above prior patent. The subscriber's line associated with line circuit 120 is assumed to be a party line having a restricted substation T3 and a non-restricted substation T4 connected thereto. Substation T3 may be like substation T1, and substation T4 may be like substation T2. The circuit details of repeater 500 will be more fully disclosed with reference to Fig. 5 in the ensuing description.

Figure 6:
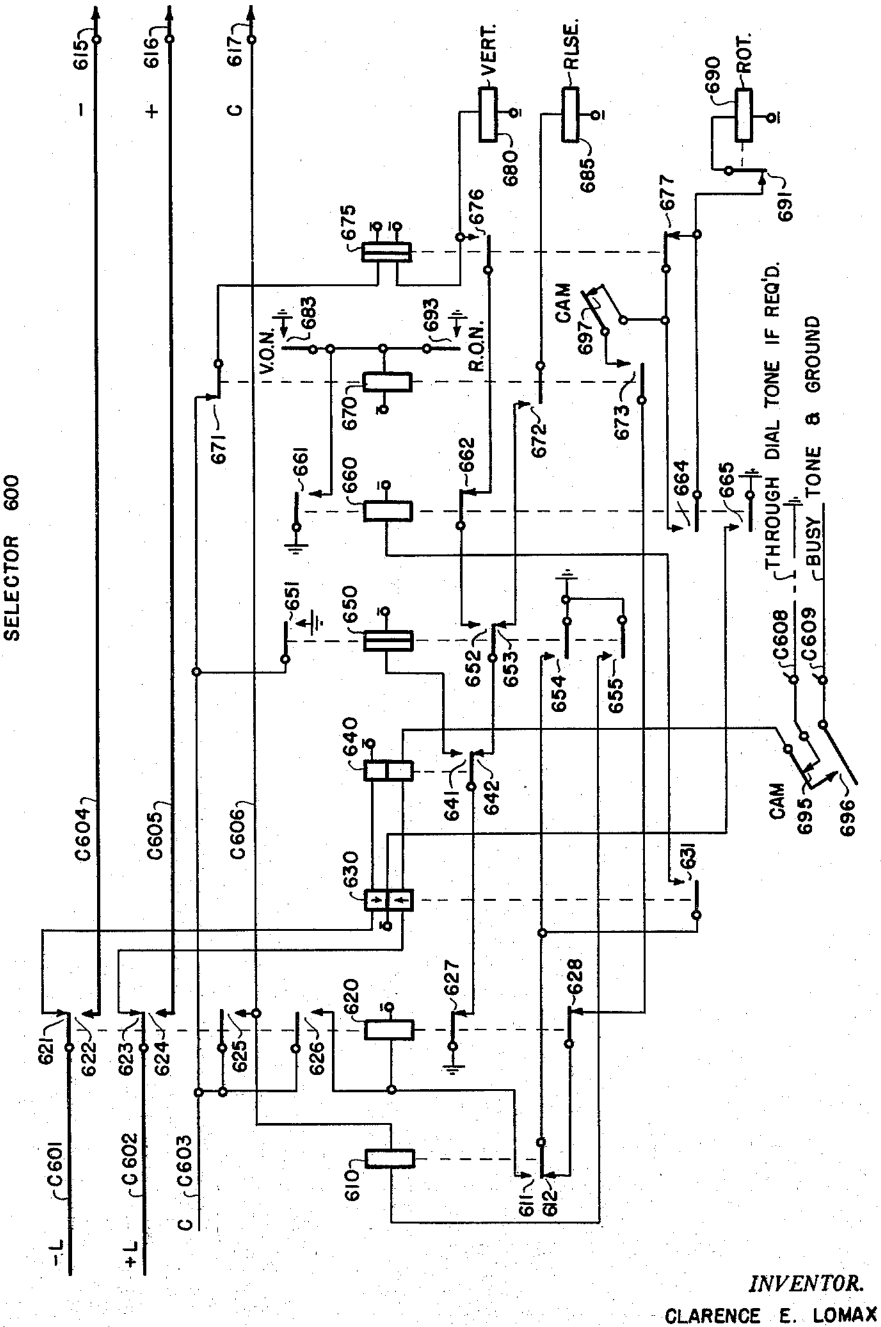
Fig. 6 shows a normal-level selector circuit arranged to provide restricted service on calls incoming in A from B.

Main exchange A (Fig. 2) includes line circuit 200, line finder 202, selector 203, and connector 204; all of these circuits, too, may be of well-known design, reference again being made to my prior patent. While repeaters 201 and 205 also may be of any conventional type the circuit details of incoming selector 600 and of special second selector 700 will be more fully disclosed with reference to Figs. 6 and 7 respectively in the ensuing description. Incoming selector 700A is of the same circuit design as special second selector 700. The subscriber's line associated with line circuit 200 is assumed to be a party line having a restricted substation T5 and a non-restricted substation T6 connected thereto. Substation T5 may be like substation T1, Fig. 1, and substation T6 may be like substation T2, Fig. 1. A trunk leading to operator's switchboard 207 is terminated by a trunk circuit 206 which may also be of any well-known design.

Figure 2:
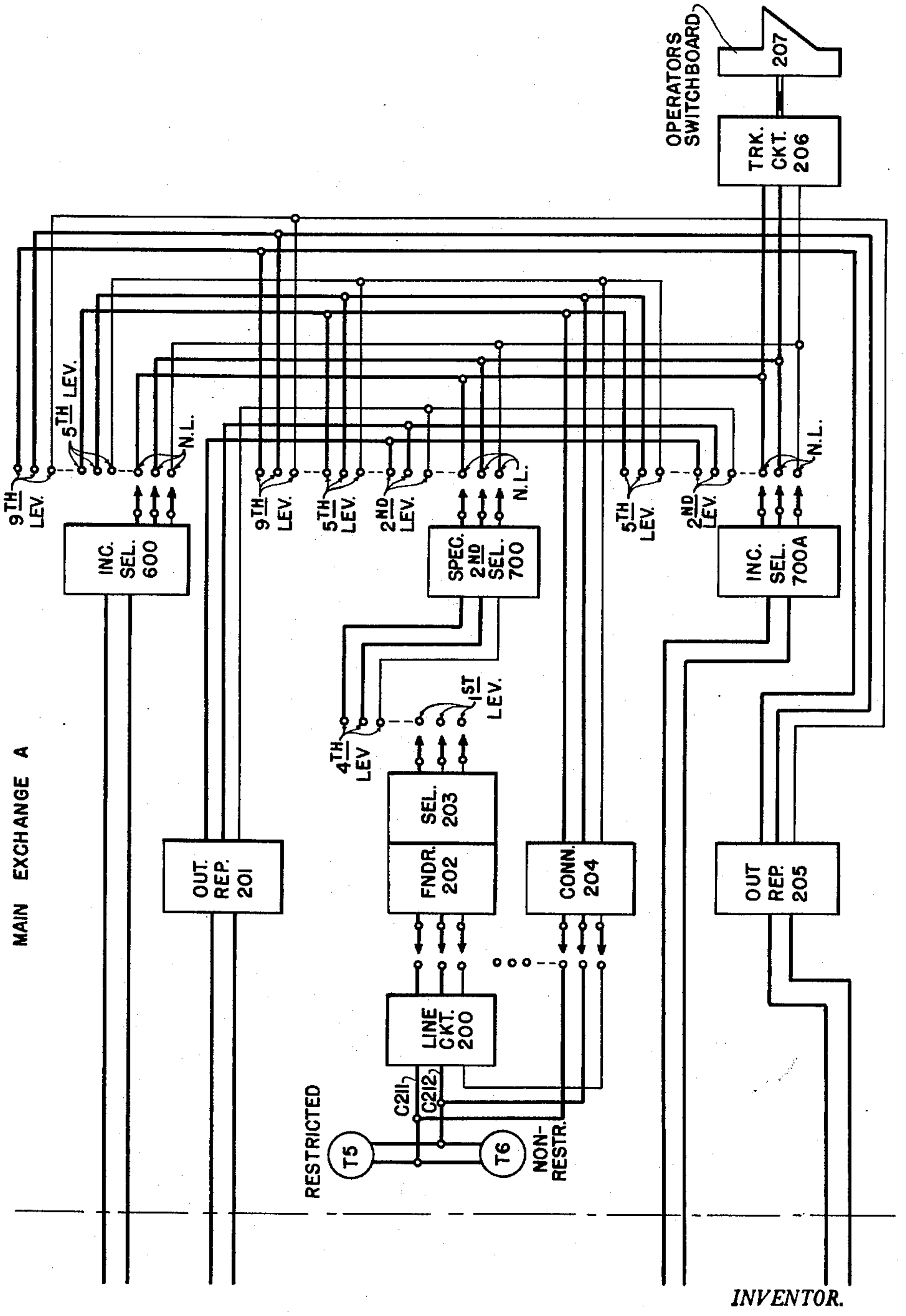
Fig. 2 shows in diagrammatic form, the switching equipment in a main exchange A. It also shows an operator's switchboard and a trunk circuit terminating an operator's trunk.

Referring to the bank multiple of selectors 600, 700, and 700A, Fig. 2, it will be noted that all these selectors have access over their fifth level to the local connectors, such as 204, in main exchange A. Moreover, all these selectors have connected to their normal level, trunk circuits such as 206, each associated with a trunk to the toll board 207 in exchange A. In addition, both selectors 700 and 700A give access over their second level to outgoing repeaters, such as 201, associated with interoffice trunks to suburban exchange B; similarly, both selectors 600 and 700 give access over their ninth level to outgoing repeaters, such as 205, terminating trunks to branch exchange C. Incoming selector 600, in turn, may be reached over the ninth level of special selector 300, outgoing repeater 400 and the associated inter-office trunk from B to A. On the other hand, incoming selector 700A may be reached over the sixth level of first selector 122, outgoing repeater 500 and an associated trunk between branch exchange C and main exchange A. This is based on the assumption that all trunks between A and C are one-way trunks. It has further been assumed that there are no direct trunks between B and C so that all calls between these two offices must be routed via main exchange A. It is to be pointed out now that although only three exchanges have been shown in Figs. 1 and 2, other exchanges, for example, additional exchanges in nearby towns or suburbs, could be accessible over other levels of selectors 600, 700 and 700A.

Referring again to special second selector 300, this selector contains a differential relay in series with its line relay. Calls over level nine of this selector by a non-restricted substation in B proceed in the conventional way. However, on calls to level nine by a restricted substation the differential relay, responding to ground transmitted by the special dial thereat at the end of the second digit, causes ground to be forwarded to a repeater such as 400, but not until this repeater has been seized. Repeater 400 repeats the ground pulse to incoming selector 600. Selector 600 has a differential relay which is thus operated immediately upon seizure of the selector. This prevents this selector from being operated to any level, but causes the call to be immediately diverted to an operator over its normal level. As a result all calls incoming in A from a restricted substation in suburban exchange B are automatically routed to an operator in A regardless of their destination.

While special second selector 700 also has a differential relay, no provisions are made for transmitting a ground pulse to this selector immediately upon seizure. Thus, when a restricted subscriber in A attempts to place an automatic call to suburban exchange by dialling "42" the ground pulse sent from the special dial at this substation at the end of the first digit "4" has no effect on first selector 203, this being a standard selector. Accordingly, the numerical impulses corresponding to the second digit "2" will move the wipers of second selector 700 to the corresponding level; but the ground pulse transmitted by the special dial at the end of this second series will operate the differential relay in this selector to cause the switch shaft to fall back to its normal level and the wipers to be automatically rotated over this level in search of an idle trunk to the operator. As a result a restricted subscriber in A may automatically set up all calls over selector 700 with the exception of calls to suburban exchange B. The operation of incoming selector 700A if a restricted subscriber at C attempts to set up an automatic call to B by dialling "62" is similar to the operation of selector 700 just described except that in this case the ground pulse sent from the special dial at the end of the second digit "2" is repeated in repeater 500.

By way of summary, non-restricted substation T2 in suburban exchange B having a conventional type telephone dial has dial access to local substations and to substations in exchanges A and C. Restricted substation T1 having the special dial has access to local substations but is diverted to a toll or intercept operator in exchange A upon attempting to call substations in exchange A or C. Non-restricted substation T4 having a conventional type telephone dial in branch exchange C has access to local substations, and may set up automatic toll calls to exchange A or B. Restricted substation T3 having the special dial has access to local substations and substations in main exchange A, but on attempting automatic calls to suburban exchange B is diverted to the toll operator in the main exchange A. Non-restricted substation T6 in the main exchange A has dial access to local subscribers in exchange A, and also to substations in exchanges B or C. Restricted substation T5 has dial access to substations in exchanges A and C, but is diverted to an operator upon attempting to place automatic calls to suburban exchange B.

No provisions have been shown in Figs. 1 and 2 by which the subscribers, both restricted and non-restricted in the various exchanges may reach the toll operator in A at will by dialling a corresponding special service number. Such facilities may readily be added by resorting to conventional arrangements.

*Outgoing calls from Exchange B—calling station is non-restricted*

Assuming that a substation, such as T2, desires to communicate with a party at substation T5 in exchange A, the calling party will initially remove the receiver to close the switch hook contacts 20 (Fig. 1). The resulting closure of the line loop via conductors C113 and C114 will therefore operate the line relay (not shown) in line circuit 101, which in turn, by means of an allotter (not shown) will cause a line finder, such as 102, to search for and connect with this calling line circuit in the manner well-known in the art. Finder 102 is linked with selector 103 which sends dial tone back to the calling party in the well-known manner.

Figure 3:
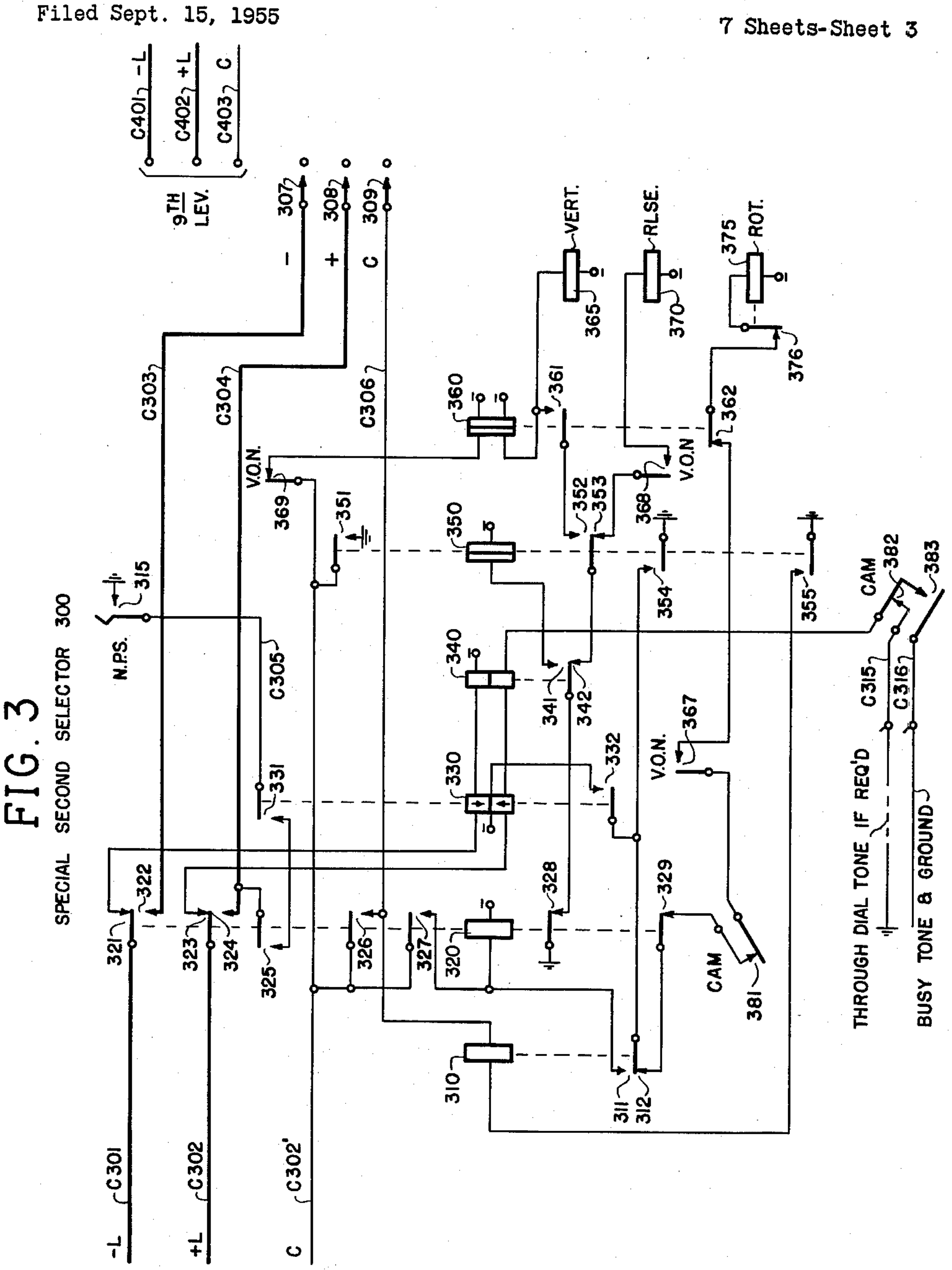
Fig. 3 shows a selector circuit designed to transmit a ground pulse in connection with the restricted service arrangement used on calls from B to A.

The dialling of the digit "5," as the first digit, will open and close the impulse springs 21 five times to send five loop impulses over the subscriber's line and operate the selector 103 to its fifth level in the well-known manner, thus causing this selector to search for and seize an idle special second selector, such as 300 connected to this level. Selector 300, Fig. 3, is marked as idle to selector 103 by battery connected to test conductor C302 via V.O.N. spring contacts 369, and the upper winding of relay 360. Upon seizure of selector 300 relay 360 operates over this path. A loop circuit is now completed for operating the pulsing relay 340 (Fig. 3); the circuit extending from the closed line loop extended through line circuit 101, finder 102 and selector 103, on the one hand by way of negative conductor C301, contacts 321, upper windings of relays 330 and 340 to battery; and on the other hand by way of positive conductor C302, contacts 323, lower windings of relays 330 and 340, cam contacts 382, and conductor C315 to ground. The relay 330 being a differential relay will not operate in this loop circuit. Relay 340 upon operating closes contacts 341 to complete an obvious operating circuit for relay 350. Relay 350 in operating at contacts 351 connects ground to the C conductor C302 to hold the preceding equipment in the well-known manner and close an obvious holding circuit for relay 360 through the upper winding thereof. At contacts 352 a circuit is prepared for pulsing the vertical magnet 365. At contacts 354 a circuit is prepared for operating the rotary magnet 375, and at contacts 355 a circuit is prepared for operating test relay 310. Relay 360 upon operation at contacts 361 closes another point in the circuit of vertical magnet 365 and at contacts 362 opens a point in the circuit of rotary magnet 375 to prevent the operation of this magnet.

Selector 300 is now prepared for the receipt of the next series of dial impulses. Assuming the next digit dialled is the digit "9," pulsing relay 340 intermittently releases nine times in response to the dial impulses, each time opening contacts 341 and closing contacts 342. Relay 350 being slow-to-release remains operated during the intermittent openings of contacts 341. During each closing of contacts 342 a circuit is completed from ground at contacts 328 via contacts 342, 352 and 361 to vertical magnet 365, in parallel with the lower winding of relay 360, whereby the wipers 307, 308, and 309 are stepped to the ninth level of the associated banks. Upon the wipers moving up one step on the first impulse the V.O.N. springs will operate whereby contacts 369 will open and contacts 367 and 368 will close. The closing of V.O.N. contacts 367 prepares a circuit for the rotary magnet 375; V.O.N. contacts 368 prepare a circuit for the release magnet 370; and at V.O.N. contacts 369 the circuit of the upper winding of relay 360 is opened. However, slow-to-release relay 360 remains operated over its lower winding during the series of impulses. Upon completion of the series of dialled impulses, relay 360 will release thereby, opening contacts 361 to thus disable the vertical magnet 365 and close contacts 362 to complete a circuit for the rotary magnet 375; the circuit extending from ground, by way of contacts 354, 312, 329, 381, 367, 362, 376, winding of rotary magnet 375 to battery. The rotary magnet by virtue of its contacts 376 will operate in self-interrupter fashion to thus rotate wipers 307, 308, and 309 over the ninth level in search of an idle repeater, such as 400 (Figs. 1 and 4) connected to this level. Repeater 400 is marked idle to selector 300 by resistance battery connected to test conductor C403 via contacts 451 and 462. The finding of battery on this test conductor completes a circuit for operating test relay 310 of selector 300; the circuit extending from battery on this conductor over wiper 309, conductor C306, winding of relay 310, contacts 355 to ground. Upon its operation relay 310 at contacts 312 opens the rotary circuit and at contacts 311 closes a circuit for operating relay 320; the circuit extending from battery through the winding of relay 320, contacts 311, 354, to ground. Relay 320 upon operating closes contacts 322 and 324 to extend the loop circuit to repeater 400. Contacts 325 close but without effect at this time. Contacts 326 close to shunt out relay 310 thereby causing its release and also to connect test conductor C302 via C306 to test wiper 309. Contacts 327 close to provide a locking circuit for relay 320; the circuit extending from battery through the winding of relay 320 and contacts 327 to ground on conductors C302 and C306. Contacts 328 open to release relay 350, at contacts 321, 323 relay 340 is permitted to restore and contacts 329 open to prevent further operation of the rotary magnet 375 in spite of the release of relay 310. Relay 350 in releasing opens contacts 351, the preceding equipment and relay 320, however, being held operated via ground returned over the test conductor of repeater 400 as will be described hereinafter. Contacts 353 close to prepare a circuit for release magnet 370.

Had no idle repeater, such as 400, been found idle during the searching movement of test wiper 309, the switch wipers would have rotated to the overflow position in the selected level to thereby operate the cam springs. Cam spring contacts 381 open to prevent further operation of rotary magnet 375. Contacts 383 close to send back busy tone to the calling party; the circuit extending from busy tone conductor C316 through contacts 383, lower windings of relays 340 and 330, contacts 323, conductor C302, back to the calling party. The calling party upon replacing the handset, breaks the loop circuit to thereby deenergize relay 340. Upon release relay 340 at contacts 342 prepares the circuit of release magnet 370. Contacts 341 open to release relay 350. The release of relay 350 at contacts 353 causes the circuit to release magnet 370 to be completed; the circuit extending from ground by way of contacts 328, 342, 353, 368, winding of magnet 370 to battery. The operation of release magnet 370 causes the wipers to be restored to their normal position which will open V.O.N. contacts 368 to restore the release magnet 370. Upon closure of V.O.N. contacts 369 selector 300 is available again for use in future calls.

Figure 4:
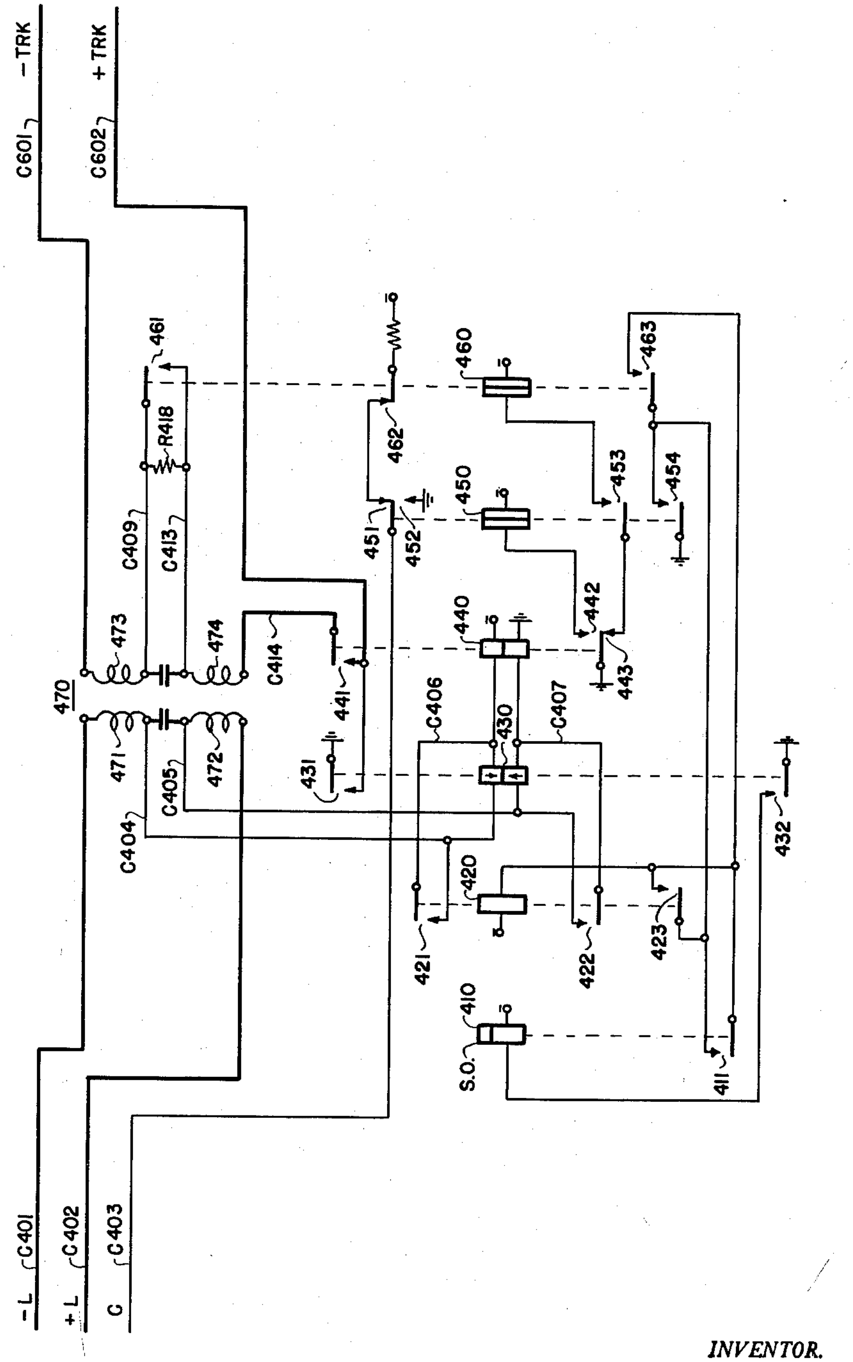
Fig. 4 shows a repeater circuit arranged to repeat this ground pulse.

Upon seizure of repeater 400 by selector 300 in the manner previously disclosed, a loop circuit is completed for operating the pulsing relay 440; this circuit extending from the above-described loop as extended by contacts 322, 324 via conductors C303, C304 and wipers 307, 308, in selector 300 (Fig. 3), conductors C401, C402, Fig. 4, upper and lower primary windings 471, 472 of repeat coil 470, conductors C404, C405 and upper and lower windings of relays 430 and 440 to battery and ground respectively. The relay 430 being of the differential type will not operate in this loop circuit. The operation of relay 440 at contacts 441 closes a loop circuit over the outgoing trunk to prepare incoming selector 600 (Fig. 2) in the main exchange A for the receipt of dial pulses. This loop circuit extends from battery through the upper windings of relays 640 and 630 (Fig. 6), contacts 621, negative conductor C601, secondary upper winding 473 of repeat coil 470 (Fig. 4), conductor C409, resistance R418, conductor C413, secondary lower winding 474 of the repeat coil, conductor C414, contacts 441, positive conductor C602, contacts 623 (Fig. 5), lower winding of relays 630 and 640, cam contacts 695, conductor C608, ground. At contacts 442 an obvious circuit is completed for operating relay 450. Upon operation relay 450 at contacts 451, 452 transfers test conductor C403 from battery to ground to hold the preceding equipment as mentioned above. At contacts 453 a circuit is prepared for operating slow-to-release relay 460. At contacts 454 a circuit is prepared for operating relay 420 which circuit, however, will not be completed in this type of call. The repeater 400 is now prepared to receive the next series of dialled impulses and repeat this series into incoming selector 600.

The dialling of "5" as the third digit will cause contacts 443 and 442 of relay 440 to be intermittently closed and opened. At contacts 443 the following circuit is intermittently closed to relay 460; ground, contacts 443, 453, winding of relay 460, battery. Relays 450 and 460 being slow-to-release remain operated during the intermittent opening and closing of contacts 443 and 442. Upon operation relay 460 at contacts 461 short-circuits resistance R418 to improve pulsing conditions over the above-traced loop circuit. In response to the five dialled impulses this loop circuit is opened and closed at contacts 441 five times, and line relay 640 of selector 600 caused to release each time. At contact 463 relay 460 closes the following circuit for relay 420: ground, contacts 454 and 463, winding of relay 420, battery. Relay 420 in operating at contacts 423 locks to ground at contacts 454 independently of relay 460; and at contacts 421 and 422 short-circuits the windings of differential relay 430. As will become clear hereinbelow, this is possible for the reason that in the embodiment described herein repeater 400 is never called upon to repeat a ground pulse after a first digital impulse series has been repeated by this repeater. At the end of the series of impulses relay 460 will restore opening contacts 461. Relays 440 and 450 will remain operated to await the dialling of further series of impulses.

Relay 640 (Fig. 6) upon originally operating in the loop circuit traced above closes its contacts 641, whereby slow-to-release relay 650 is operated over an obvious circuit. Upon operation relay 650 at contacts 651 completes a circuit to relay 675; the circuit extending from ground through contacts 651 and 671, and the upper winding of slow-to-release relay 675 to battery. Test conductor C603 is not connected as selector 600 is used as an incoming switch in the instant case. At contacts 654 a circuit is prepared for operating the rotary magnet 685. At contacts 655 ground is connected to test relay 610. Relay 675 in operating at contacts 676 prepares a circuit for the operation of the vertical magnet 680. At contacts 677 a point is opened in the circuit of rotary magnet 690 to prevent the operation of the rotary magnet at this time.

On each release of relay 640 in response to the repetition by repeater 400 of the third digit "5" contacts 642 complete the following impulsing circuit: ground, contacts 627, 642, 652, 662, 676, winding of magnet 675 and, in parallel thereto, lower winding of relay 675, to battery. Slow-releasing relay 650 is held via contacts 641 throughout the impulse series. Upon the first dialled impulse of the series, wipers 615, 616, and 617 will vertically move one step and the V.O.N. springs will operate, whereby contacts 683 will close to complete an obvious operating circuit for relay 670. Upon operation relay 670 at contacts 671 opens the circuit extending through the upper winding of relay 675, however, relay 675 due to its slow-release characteristic remains operated throughout the series of impulses through its lower winding. At contacts 672 a circuit is prepared for the operation of release magnet 685 and at contacts 673 for the operation of rotary magnet 690.

At the end of the impulse series wipers 615–617 have been positioned opposite the fifth level of the switch and relay 675 restores, disconnecting the vertical magnet at contacts 676. The release of relay 675 at contacts 677 completes the following circuit for the operation of the rotary magnet: battery, winding of rotary magnet 690, contacts 691, 677, 697, 673, 628, 612, 654, ground. Due to its contacts 691 rotary magnet 690 operates in self-interrupter fashion to rotate wipers 615, 616, and 617 over the bank contacts of the fifth level in search of an idle connector. Assuming that an idle connector, such as 204 (Fig. 2) is found, the battery on its C conductor will operate relay 610; the circuit extending from battery on this conductor via wiper 617, conductor C606, winding of relay 610, contacts 655, ground. Upon operation relay 610 at contacts 612 opens the rotary magnet circuit to prevent further rotary motion; and at contacts 611 completes a circuit for operating relay 620. The last-mentioned circuit may be traced from battery, through the winding of relay 620, contacts 611, 654, to ground. Relay 620 upon operating at contacts 622 and 624 extends the loop from repeater 400 by way of conductors C604, C605 and wipers 615, 616 to the line conductors, not shown, in connector 204. At contacts 625 and 626 relay 620 locks to ground at contacts 651, and short circuits relay 610, thereby initiating the release of this relay. Incident to the seizure of connector 204, ground is returned over the C conductor thereat in the well-known manner, whereby the continued holding of relay 620 is insured. At contacts 621 and 623 the circuit of relay 640 is opened permitting this relay to release, and with contacts 627 and 641 open relay 650 also restores. The remaining digits of the called subscriber's number may now be repeated by repeater 400 directly into connector 204, whereby a connection is established with the line C211, C12 of called party T5. In this line is idle connector 204 will send ringing current thereover in the well-known manner to signal the called party.

At the end of the conversation when the calling party at substation T2 replaces his handset, opening of the calling loop at switch hook contacts 20 permits relay 440 and, hence, 450 and 420 in repeater 400 to restore.

When ground is removed at contacts 452 from conductor C403, switching relay 320 in selector 300 is permitted to restore and the release of the preceding equipment initiated. The following circuit is now closed for release magnet 370: ground, contacts 328, 342, 353, 368, winding of magnet 370, battery. Upon the operation of release magnet 370 the switch mechanism and, hence, the V.O.N. springs are returned to normal condition. The circuit of the release magnet is opened at V.O.N. contacts 368 and at contacts 369 the switch is rendered available again for use in other calls. Incident to the release of relay 440, Fig. 4, the outgoing loop is opened at contacts 441 so that the line relay, not shown, in connector 204 releases. This connector accordingly restores, removing ground from its incoming test conductor and thereby bringing about the release of relay 620, Fig. 6, in the well-known manner. Consequently, the following circuit for release magnet 685 is now completed: ground, contacts 627, 642, 653, 672, magnet 685, battery. The mechanism of selector switch 600 accordingly restores to normal and the off-normal springs are returned to normal condition. Relay 670 accordingly restores, opening the circuit of release magnet 685 at contacts 672.

Assuming no idle connector has been found during rotation of the wipers of incoming selector 600, the wipers rotate to the overflow position. In this position the cam springs are operated causing contacts 695 and 697 to break and contacts 696 to make. The breaking of contacts 695 opens the original loop circuit including relay 640, however at contacts 696 busy tone and ground from conductor C609 is applied to maintain this relay operated. Busy tone is returned to the calling party via contacts 696, lower windings of relays 640 and 630, contacts 623, and positive line conductor C602.

Upon the calling party at substation T2 noticing the busy tone, he replaces the handset on the cradle thereby breaking the switch hook contacts 20 and hence the calling loop are opened so that relay 440, Fig. 4, releases permitting relays 450 and 420 also to restore. At contacts 441 the outgoing loop circuit is opened to restore relay 640. This relay in releasing opens contacts 642 to release relay 650. Relay 650 upon restoring at contacts 653 completes a circuit for operating the release magnet 685; the circuit extending from ground through contacts 627, 642, 653, 672, winding of release magnet 685 to battery. The release magnet 685 operates to restore the wipers to their normal positions, thereby opening the V.O.N. springs. This brings about the release of relay 670 which at its contacts 672 opens the circuit of release magnet 685.

Assuming that substation T2 desires to call substation T3 in Branch Exchange C, repeater 400 and incoming selector 600 will be seized responsive to the dialling of the initial two digits "59" in the manner previously disclosed. However, in the present case the third digit dialled is "9," whereby the wipers 615, 616, and 617 of selector 600 are raised to the ninth level giving access to repeaters, such as 205, associated with trunks to exchange C. Assuming repeater 205 is found idle incident to the trunk-hunting operation of selectors 600 over this level repeater 205 will receive the next dialled digit and repeat it into incoming selector 124 (Fig. 1) in a well-known manner. The selector 124 will thereby operate to the level corresponding to the digit dialled and search for an idle connector, such as 123. The connector 123 will then receive the remaining digits as repeated by repeater 205 to establish a connection with the called party T3 and cause this party to be rung. The release of the connection taken place in a manner analogous to that described above for a call to substation T5.

*Outgoing call from exchange B—calling station is restricted*

Assuming that a restricted substation, such as T1 (Fig.

1) containing the special type dial, desires to communicate with the party at substation T6 in the main exchange A, the calling party will initially remove the handset. The resulting closure of the line loop seizes line circuit 100 over conductors C111 and C112 (Fig. 1) which in turn causes a finder, such as 102, to search for the calling party. Selector 103 which is linked to finder 102 sends dial tone back to the calling party in the well-known manner.

The first digit dialled in the instant case being the digit 5, selector 103 will receive the five impulses and operate its wipers to the fifth level. It will be recalled that the special dial at substation T1 sends a ground pulse immediately after completion of each digit dialled. However, since selector 103 is of conventional design this ground pulse will have no effect on selector 103 other than holding its line relay (not shown) operated over its battery-connected winding for the duration of the pulse. At the end of the digit the switch wipers will rotate over the selected level in the usual manner in search of an idle special second selector. Assuming that special second selector 300 is seized, then selector 103 in switching through extends the loop to relays 330 and 340 in this selector. Differential relay 330 does not operate over the loop circuit. Relay 340 in operating in turn operates relay 350 as previously described.

The next dialled digit being the digit "9," relay 340 will restore and reoperate nine times to operate the wipers 307–309 to the ninth level in the manner previously described, normal post springs 315 operating at this level. However, at the end of the series of impulses a ground pulse is transmitted by the special dial at substation T1, whereby the lower windings of differential relay 330 and line relay 340 are short-circuited over the following path: ground, contacts 11, hookswitch contacts 10, line conductor C112, positive line conductor in line circuit 100, finder 102 and selector 103, conductor C302 of selector 300, contacts 323, lower windings of relays 330 and 340, ground. Due to this unbalancing of the line differential relay 330 operates while relay 340 is maintained operated over the negative leg of the line. Relay 330 upon operating at contacts 331 closes a point in a ground connection to wiper 308. At contacts 332 a circuit is completed for locking relay 330 operated; the circuit extending from battery through the center winding of relay 330, contacts 332, 354, to ground. As line relay 340 reoperates and remains operated at the end of the series of digital impulses, change-over relay 360 releases with a slight delay, thereby at contacts 362 closing the self-interrupter circuit for the rotary magnet as described above, to automatically drive the switch wipers over the selected level in search of an idle repeater. When an idle repeater, such as 400, has been found relay 310 operates, in turn operating switching relay 320 as previously described. The switching functions of relay 310 are the same as above described except that in the present instance ground is momentarily placed on conductor C304, whereby the lower windings of differential relay 430 and line relay 440 of repeater 400 are short-circuited over the following path: ground, NPS contacts 315, conductor C305, contacts 331, 325, conductor C304, wiper 308, positive conductor C402 (Fig. 4), lower primary winding 472 of repeat coil 470, conductor C405, lower windings of relays 430 and 440, ground. Due to this unbalancing differential relay 430 operates in addition to line relay 440 over the negative leg of the loop circuit. When relay 340 and, hence, 350 restores incident to the opening of contacts 321, 323 the aforementioned locking circuit for relay 330 is opened at contacts 354. As a result relay 330 releases, disconnecting at contacts 331 the above ground from conductor C304. Differential relay 430 in repeater 400 is thus permitted to restore while line relay is held operated over the loop circuit and both of its windings. It will be noted from the above that the release of slow-releasing hold relay 350 incident to the switching-through of selector 300 is utilized in this manner to insure that ground is maintained on conductor C304 sufficiently long for differential relay 430, Fig. 4, to operate.

Upon the operation of line relay 440 contacts 441 close to interconnect trunk conductors C601, C602 but due to the simultaneous operation of differential relay 430 in the instant case ground is placed on these conductors so that the lower windings of relays 630 and 640 in selector 600 (Fig. 6) are short-circuited from ground at contacts 431 by way of conductor C602, contacts 623 (Fig. 6), lower windings of relays 630 and 640, contacts 695, conductor C608 to ground. Both relays 630 and 640 accordingly operate through their upper windings.

Reverting to the operation of repeater 400, at contacts 442 an obvious circuit is completed for operating relay 450 and at contacts 432 for operating relay 410. Upon the operation of relay 450 contacts 452 close to hold the preceding equipment as before mentioned. Subsequent to the operation of slow-to-operate relay 410 a circuit is completed for operating relay 420; the circuit extending from battery through the winding of relay 420, contacts 411, 454 to ground. Relay 420 at contacts 421 and 422 short-circuits the two windings of relay 430, thereby to restore relay 430 after a further delay. The overall delay in releasing relay 430 results in the trunk being grounded long enough to insure the above-mentioned operation of differential relay 630 in incoming selector 600 under all conditions. It should be understood that in the instant embodiment the ground pulse as transmitted from selector 300, Fig. 3, will ordinarily be long enough by itself to insure safe operation of relay 630, Fig. 6. However, the pulse-correcting arrangement comprising relays 410, 420 in Fig. 4 will serve to illustrate how the ground pulse received by such a repeater can be corrected in all instances where such correction is needed. At contacts 423 a locking circuit is closed to maintain relay 420 operated and hence, relay 430 short-circuited when relay 410 restores upon its circuit being opened at contacts 432 of relay 430. The locking circuit extends from battery through the winding of relay 420, contacts 423, 454 to ground.

Relay 640 in selector 600 upon operating at contacts 641 completes an obvious circuit to operate relay 650. Relay 630 upon its operation at contacts 631 completes a circuit, extending from ground at contacts 654 of relay 650, for operating relay 660. At contacts 665 an obvious locking circuit is closed to maintain relay 630 operated through its center winding. At contacts 661 an obvious circuit is completed for operating relay 670. Relay 670 at contacts 671 opens the circuit to the upper winding of relay 675 so that relay 675 is prevented from operating or remaining operated, whereby a point in the operating circuit of vertical magnet 680 is held open at contacts 676. Relay 660 at contacts 662 opens a further point in this circuit to prevent the operation of the vertical magnet. It will be noted that one branch of the operating circuit of rotary magnet 690, too, is held open at contacts 677 of relay 670 but upon the closure of contacts 673 this circuit is completed by way of a parallel branch including contacts 664; the circuit extending from battery, through the winding of magnet 690, contacts 691, 664 or 677, 697, 673, 628, 612, 654, to ground. The rotary magnet 690 will open and close its interrupter contacts 691 to automatically rotate the wipers 615, 616, and 617 over the banks of the normal level in search of an idle operator's trunk. Assuming that an idle trunk circuit, such as 206 (Fig. 2), is found, the battery on its test conductor will operate relay 610; the circuit extending from battery on this conductor via wiper 617, conductor C606, winding of relay 610, contacts 655 to ground. Upon operation relay 610 at contacts 612 opens the rotary magnet circuit and at contacts 611 closes a circuit to switching relay 620. Relay 620 upon operating switches the talking circuit through at contacts 622, 624 and at contacts 621, 623 permits line relay 640 to release. Due to the opening of contacts 627 relay 650 restores, in turn permitting relays 610 and 660 to release. Relay 660 at contacts 665 lets relay 630 release but relay 670 is held by way of rotary-off-normal contacts 693. The call from restricted substation T1 is thus received by the operator at switchboard 207 via trunk circuit 206 in a well-known manner, and the operator then proceeds to either ticket the call or deny the call outright as required under the circumstances.

Since selector 600 diverts all calls received thereby from a restricted substation to the operator regardless of the intended destination of the call it is to be understood that should restricted substation T1 attempt to call a substation in Branch Exchange C the call would be diverted to the toll operator in the same manner as described above.

Should no operator's trunk be found idle, the wipers 615–617 would rotate to the over flow position in the normal level and upon actuation of the cam springs in this position the movement of the wipers would be stopped and busy tone returned in the manner previously described.

*Outgoing calls from exchange C—calling stations is non-restricted*

Assuming that a non-restricted substation, such as T4 of the Branch Exchange C containing the conventional type dial, desires to communicate with the party at substation T2 in exchange B, the calling party will initially remove the handset. Due to the closure of the line loop over conductors C115 and C116 (Fig. 1) line circuit 120 will cause a finder, such as 121, to search for the calling party. Selector 122 which is linked up with finder 121 sends dial tone back to the calling party in the well-known manner.

The first digit dialled in this case being the digit "6," selector 122 will receive the six impulses and operate its wipers to the sixth level. At the end of the digit the switch wipers will thus rotate over the selected level in the usual manner in search of an idle outgoing repeater. Assuming that repeater 500 (Fig. 5) is seized, due to resistance battery being present on test conductor C503 via contacts 533 and 542 then selector 122 in switching through extends the loop to relays 510 and 520, Fig. 5; the circuit extending from the closed line loop, on the one hand by way of negative conductor C501, upper primary winding 551 of repeat coil 550, conductor C504, upper windings of relays 510 and 520 to battery; and on the other hand by way of positive conductor C502, lower primary winding 552, conductor C505, lower windings of relays 510 and 520 to ground. Relay 510 being a differential relay will not operate in this loop circuit. Relay 520 upon operating at contacts 522 completes an obvious circuit for operating relay 530, and at contacts 521 closes the following loop circuit for operating line relay 725 in incoming selector 700A, Fig. 7: battery, upper windings of relays 725 and 720, contacts 711, trunk conductor C701, contacts 521, winding 533 of repeat coil 550, resistance R515, winding 534 of the repeat coil, trunk conductor C702, contacts 713, lower windings of relays 720 and 725, ground. Upon operation relay 530, Fig. 5, at contacts 531 prepares a circuit to slow-to-release relay 540. At contacts 532, ground is placed on test conductor C503 to hold the preceding equipment in the well-known manner.

The next dialled digit being the digit 2, relay 520 will restore and reoperate two times in response to the dial pulses. Closure of contacts 523 on the first release of relay 520 operates slow-to-release relay 540 which remains operated throughout the series of impulses; and relay 530 because of its slow-to-release characteristics also remains operated throughout the series despite the intermittent opening of contacts 522. Upon operation relay 540 at contacts 541 short-circuits resistance R515, thereby to improve pulsing conditions over the trunk loop.

Figure 7:
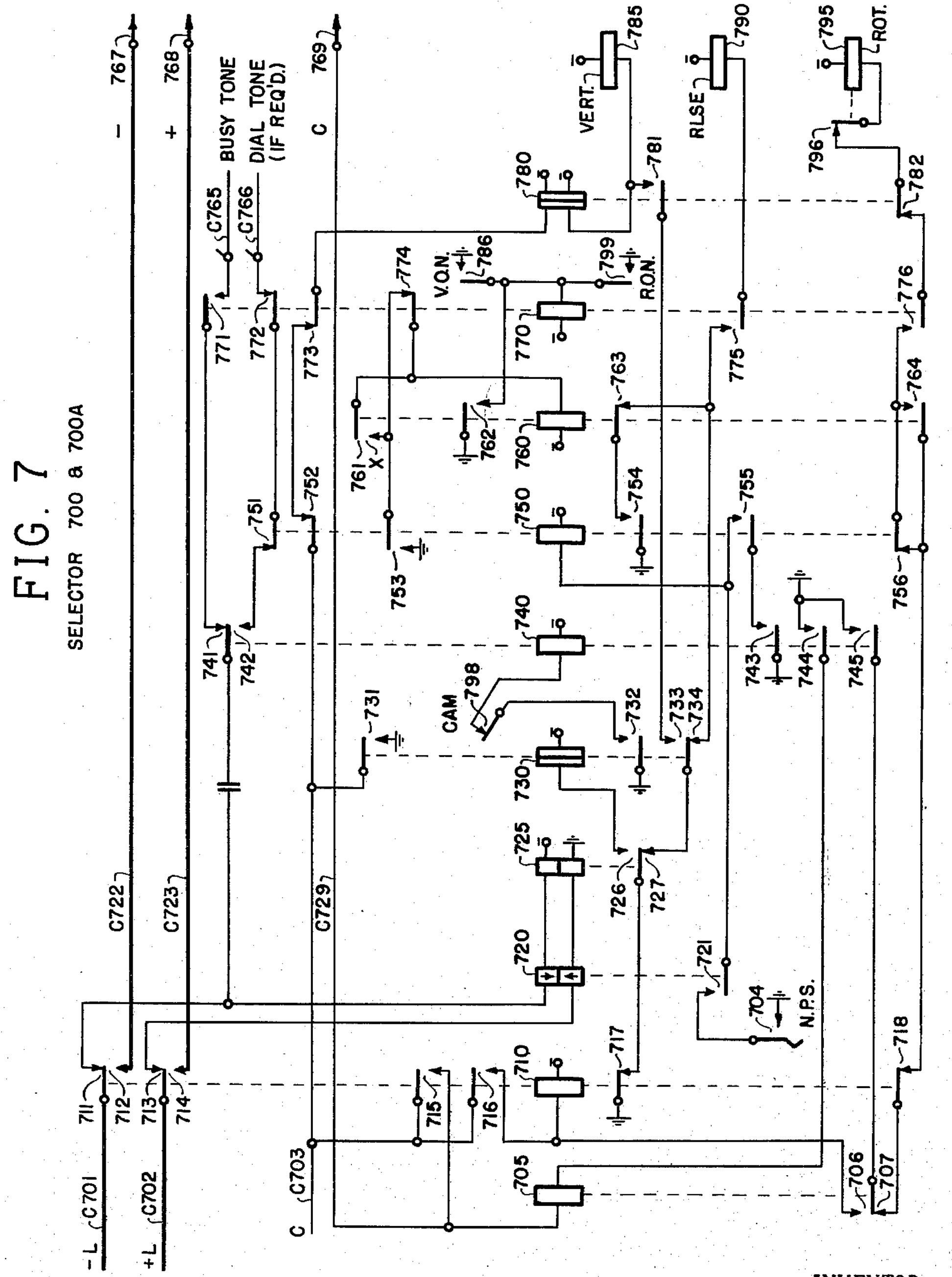
Fig. 7 shows a normal-level drop back selector circuit arranged to provide restricted service on calls originating in A or on calls incoming in A from C.

When relay 725 (Fig. 7) operated upon closure of the trunk loop it completed at contacts 726 an obvious circuit for operating relay 730. Relay 730 upon operating at contacts 731 completes the following circuit for operating relay 780: ground, contacts 731, 752, 773, upper winding of relay 780, battery. At contacts 732 an obvious circuit is completed for operating relay 740. At contacts 733 a circuit is prepared for energizing the vertical magnet 785. Upon operation relay 740 at contacts 742 connects dial tone conductor C766 to the negative conductor C701; however, since the selector shown in Fig. 7 is used as an incoming selector, conductor C766 is not connected to the dial tone source in this case. At contacts 743 a locking circuit is prepared for relay 750. At contacts 744 ground is connected to the winding of test relay 769, and at contacts 745 a circuit is prepared for operating the rotary magnet 795. Relay 780 in operating at contacts 781 closes another point in the circuit of vertical magnet 785, and at contacts 782 prevents premature operation of rotary magnet 795.

Upon receipt of the two repeated dial impulses from repeater 500, relay 725 will restore and reoperate two times. Relay 730 being slow-to-release remains operated during intermittent openings of contacts 726. Closure of contacts 727 on the first release of relay 725 completes a circuit for operating the vertical magnet 785, viz. from ground, through contacts 717, 727, 733, 781, winding of vertical magnet 785 to battery. Thus, upon receipt of the first impulse of the series, vertical magnet 785 will move wipers 767, 768, and 769 up one step and operate the V.O.N. contacts. The closing of V.O.N. contacts 786 completes an obvious circuit for operating relay 770. Relay 770 in operating at contacts 771 prepares a busy tone circuit. At contacts 772 a circuit is opened to take dial tone off of the negative conductor C701 in those instances in which dial tone is used. At contacts 773 the operating circuit extending through the upper winding of relay 780 is opened however, due to its slow-to-release characteristics relay 780 remains held through its lower winding during the series of impulses, in parallel with magnet 785. At contacts 774 a circuit is opened to prevent the operation of relay 760. At contacts 775 a circuit is prepared for operating the release magnet; and at contacts 776 another point is closed in the circuit of rotary magnet 795. When vertical magnet 785 receives the second of the two ground pulses from contacts 727 it moves the wipers 767, 768, and 769 to the second level. The second level of selector 700A being a restricted level, normal post contacts 704 will operate upon the wipers reaching this level, however, since differential relay 720 does not operate over the trunk loop the closing of these contacts has no effect in the case of a call from a non-restricted station. At the end of the series of impulses relays 725, 730, 740, and 770 are in operated condition but relay 780 will restore, thereby opening contacts 781 and closing contacts 782.

The following circuit is now completed for operating the rotary magnet 795: battery, winding of rotary magnet 795, contacts 796, 782, 776, 756, 718, 707, 745, ground. Due to the action of its self-interrupter contacts 796 rotary magnet 795 will therefore rotate the switch wipers over the second level in search of an idle outgoing repeater. On the first rotary step rotary-off-normal contacts 799 are closed. When an idle repeater, such as 201 (Fig. 2), is found, battery will be received therefrom over test wiper 769 to operate relay 705; the circuit extending from the battery connection to the test conductor, not shown, of repeater 201, wiper 769, conductor C729, winding of relay 705, contacts 744, to ground. Upon operation relay 705 at contacts 707 opens the rotary magnet circuit and at contacts 706 completes a circuit for operating relay 710, viz. from battery, through the winding of relay 710, contacts 706, 745, to ground. Relay 710 at contacts 716 provides a locking circuit for itself extending to ground at contacts 731, and at contacts 715 causes relay 705 to be short-circuited so that this relay restores; at contacts 711 and 713 relay 710 permits relay 725 to release; and at contacts 712 and 714 it extends the loop to repeater 201, Fig. 2. At contacts 715 test conductor C703 is now by way of conductor C729 and wiper 769 to the test conductor, not shown, of repeater 201 so that ground returned over this conductor upon seizure of the repeater in the well-known manner causes an alternative locking circuit to be completed for relay 710. Relays 730 and, hence, 740 restore incident to the release of relay 725. Repeater 201 will now receive the next series of impulses and repeat them to an incoming selector 105 in exchange B. The further extension of the connection to the party at substation T2 in exchange B by way of connector 104 may take place in accordance with conventional principles and, therefore, requires no detailed explanation.

Had no idle repeater been found during rotation of the wipers of selector 700A, the wipers would have rotated to the overflow on eleventh rotary position, thereby operating the cam springs. The opening of cam contacts 798 opens the circuit to deenergize relay 740. Upon restoration of relay 740 at contacts 741 completes a circuit for sending back busy tone to the calling party; the circuit extending from conductor C765, contacts 771, 741, busy tone condenser, contacts 711, negative conductor C701, to the calling substation T4, notifying the subscriber of the busy condition.

Upon the calling party noticing the busy tone, he will replace the handset upon the switch hook (not shown), thereby opening the loop circuit to restore relay 520 of repeater 500 (Fig. 5) which accordingly opens its contacts 522 to restore relay 530. At contacts 532 relay 530 in restoring, removes ground from conductor C503, thereby permitting the preceding equipment to restore. Relay 520 in releasing at contacts 521 further opens the trunk loop to restore relay 725 (Fig. 7). Relay 725 upon releasing at contacts 726 releases relay 730 which accordingly closes contacts 734 to complete the following circuit for release agnet 790: ground, contacts 717, 727, 734, 775, winding of magnet 790, battery. The operation of release magnet 790 restores the switch mechanism to its normal position so that off-normal contacts 799 and 786 are opened. Relay 770 accordingly restores, at contacts 775 opening the circuit of and thereby restoring release magnet 790. Upon closure of contacts 773 selector 700A is available again for seizure on future calls.

Assuming that the subscriber at substation T4 desires to make a call to substation T5 in the Main Exchange A, the repeater 500, Fig. 1, will be seized responsive to the dialling of the initial digit 6 in the manner previously described, providing this repeater is found idle. However, in the present case the second digit dialled is "5," whereby wipers 767, 768, and 769 of incoming selector 700A in response to the repeated impulses from repeater 500 are raised to the fifth level giving access to connectors such as 204 in exchange A. Level five of selector 700A being a non-restricted level will not cause the normal post springs to operate, although this is of no consequence in the present case since substation T4 is non-restricted. Connector 204 will then receive the next series of impulses, whereby extension of the connection to substation T5 in exchange A may take place in accordance with conventional principles and, therefore, requires no detailed explanation.

If no idle connector is found during rotation of the wipers of selector 700A, selector 700A and the preceding equipment restores upon the calling party replacing the handset after being notified of the busy condition in the manner previously described.

*Outgoing calls from exchange C—calling station is restricted*

Assuming that the subscriber at a restricted substation, such as T3, in exchange C (Fig. 1), desires to communicate with the party at substation T1 in exchange B, the calling party will initially remove the handset. The resulting closure of the line loop will operate the line relay, not shown, in line circuit 120 over conductors C115 and C116 (Fig. 1) which in turn causes a finder, such as 121, to search for the calling party. Selector 122 which is linked to finder 121 sends dial tone back to the calling party in the well-known manner.

Since the first digit dialled in the present instance is the digit "6," selector 122 will receive the six impulses and operate its wipers to the sixth level. It will be recalled that the substation T3, being restricted is equipped with a special type dial which sends a short ground pulse immediately after completion of each digit dialled. However, since selector 122 is of conventional design this ground pulse will have no effect on selector 122 other than holding its line relay (not shown), operated over its battery-connected winding for the duration of the pulse. At the end of the digit the switch wipers will thus rotate over the selected level in the usual manner in search of an idle outgoing repeater. Assuming that repeater 500 is seized, then selector 122 in switching through extends the loop to relays 510 and 520 in this repeater. Differential relay 510 does not operate over the loop. Relay 520 in operating in turn operates relay 530 as previously described. At contacts 521 relay 520 closes the trunk loop to operate relay 725, thereby preparing incoming selector 700A for the receipt of the next series of impulses as repeated by repeater 500.

The next dialled digit being the digit "2," relay 520 will restore and reoperate two times. Closure of contacts 523 on the first release of relay 520 operates slow-to-release relay 540 to improve pulsing conditions. The intermittent opening of the trunk loop at contacts 521 causes line relay 725, Fig. 7, to follow the repeated pulses, thereby causing the wipers of incoming selector 700A to be raised to the second level in the manner previously described. As mentioned above, normal post springs 704 are actuated on this level. The ground pulse transmitted from the special dial after the completion of this second digit causes the momentary operation of differential relay 510. Relay 510 in operating at contacts 511 repeats the ground pulse over the trunk to short-circuit the lower winding of differential relay 720 (Fig. 7) over the following circuit path: ground, contacts 511, conductor C702, contacts 713, Fig. 7, lower winding of relays 720 and 725, ground. This unbalancing of the trunk causes differential relay 720 to operate while line relay 725 is held over its upper winding.

Differential relay 720 in operating, at contacts 721 completes the following circuit for operating relay 750: ground, NPS contacts 704, contacts 721, winding of relay 750, battery. Upon operation relay 750 at contacts 756 opens a point in the rotary magnet circuit and at contacts 752 opens another point in the circuit of relay 780 this circuit having previously been opened at contacts 773 of relay 770. At contacts 753 a circuit is prepared for operating relay 760. After a short interval relay 720 releases opening contacts 721 and the circuit energizing relay 750 however, not before relay 750 locks itself operated via contacts 755 and 743. At contacts 754 a circuit is completed for operating the release magnet 790; the circuit extending from ground, via contacts 754, 763, 775, winding of release magnet 790, to battery. Release magnet 790 operates to restore the wipers to their normal positions, thereby opening the V.O.N. spring contacts 786 to permit relay 770 to restore. Relay 770 upon releasing at contacts 775 opens the circuit of release magnet 790 allowing it to restore. At contacts 774 relay 770 closes the following circuit for relay 760:

ground, contacts 753, 774, winding of relay 760, battery. At contacts 762 an obvious circuit is completed to reoperate relay 770 but at "X" contacts 761 an obvious locking circuit is completed in good time to maintain relay 760 operated independently of relay 770. At contacts 763 a circuit is opened to prevent operation of release magnet 790 upon reoperation of relay 770.

Provided that relay 780 has completed its release in the meantime, the following circuit is now closed for operating rotary magnet 795: ground, contacts 745, 707, 718, 764, 776, 782, 796, winding of rotary magnet 795, battery. Due to the action of its self-interrupter contacts 796 the rotary magnet 795 will thereby rotate wipers 767, 768, and 769 over the normal level of the switch, in search of an idle operator's trunk. On the first rotary step contacts 799 close to hold relay 770 operated independently of relay 760. When an idle operator's trunk circuit, such as 206 (Fig. 2), is found, battery will be received therefrom over test wiper 769 to operate relay 705; the circuit extending from the battery connection to the test conductor, not shown, of trunk circuit 206, wiper 769, winding of relay 705, contacts 744, to ground. Relay 705 at contacts 707 opens the rotary magnet circuit and at contacts 706 operates relay 710 to cause the talking circuit to be switched through to operator's trunk circuit 206. The functions of switching relay 710 otherwise are similar to those described above for a call from a non-restricted station, except that in the present instance relays 750 and 760 also restore incident to the release of relays 725, 730, and 740. Trunk circuit 206 upon seizure extends the connection to operator's switchboard 207 in a well-known manner.

Upon answering the call, the operator will notify the calling party that he is restricted from making calls thereto or she will deal with the matter as circumstances may require. At the end of the conversation, when both the calling party and the operator have disconnected, holding ground is removed from the test conductor in trunk circuit 206 in the manner well-known in the art, whereby switching relay 710 is permitted to restore the release of the switch mechanism of selector 700A then takes place substantially as above described.

Assuming that restricted substation T3 desires to communicate with the party at substation T6 in exchange A, the repeater 500 connecting incoming selector 700A will be seized responsive to the dialling of the digit "6" in the manner previously described. However, in the present case the second digit dialled is "5" as previously described. Repeater 500 will repeat the five impulses into selector 700A and operate wipers 767–769 to the fifth level in the manner described. However, as level five of this selector is non-restricted normal post contact 704 will not operate in this case. Therefore, while the momentary ground pulse as transmitted by the special dial at station T3 and repeated by repeater 500 will again operate the differential relay 720 relay 750 will not be able to operate and lock in this case and as a result the call will not be diverted to the operator. Instead, the call is completed over the selected fifth level as described above with respect to a call from non-restricted substation T4.

*Outgoing calls from exchange A—calling station is non-restricted*

Assuming that a non-restricted substation, such as T6 in exchange A, desires to communicate with a party at substation T2 in exchange B, the calling party will initially remove the receiver. The resulting closure of the line loop via conductors C211 and C212 will therefore operate the line relay, not shown, in line circuit 200 which in turn, by means of an allotter (not shown) will cause a line finder, such as 202, to search for and connect with the calling party in a well-known manner. Finder 202 is linked with selector 203 which sends dial tone back to the calling party in the manner well-known in the art.

The dialling of the digit "4," as the first digit, will transmit four loop impulses to selector 203, whereby the wipers of this selector are raised to its fourth level and then automatically rotated in search of an idle special second selector, such as 700, connected to this level. Selector 700, Fig. 7, is marked as idle to selector 203 by battery connected to test conductor C703 via contacts 752, 733 and the upper winding of relay 780. Upon seizure of selector 700 by selector 203 relay 780 operates over this connection; also the following loop circuit is now completed for operating pulsing relay 725 (Fig. 7): from the closed line loop extended through line circuit 200, finder 202 and selector 203, on the one hand by way of negative conductor C701, contacts 711, upper winding of relays 720 and 725 to battery; and on the other hand by way of positive conductor C702, contacts 713, lower windings of relays 720 and 725 to ground.

Relay 720 being a differential relay will not operate in this loop circuit. Relay 725 in operating closes contacts 726 to complete an obvious circuit operating relay 730. Upon operation relay 730 at contacts 731 places ground on test conductor C703 to hold the preceding equipment and maintain relay 780 operated. At contacts 732 an obvious circuit is completed for relay 740 which upon operating functions as described above for a call over selector 700A.

The next digit dialled being the digit "2", pulsing relay 725 intermittently releases during the dialling of the impulses and thereby opens and closes contacts 726 and 727. Relay 730 being slow-to-release remains operated during intermittent openings of contacts 726. During each closing of contacts 727 the above-traced circuit is completed to vertical magnet 785 whereby wipers 767, 768, and 769 are stepped to the second level of the associated banks. Upon the wipers moving up one step relay 770 operates from ground at V.O.N. contacts 786, with the switching functions above described. When relay 780 releases upon completion of the series of dialled impulses the above-traced self-interrupter circuit is completed for rotary magnet 795 so that wipers 767, 768, and 769 are rotated over the second level in search for an idle repeater. Repeater 201 (Fig. 2) is marked idle to incoming selector 700 by battery connected to the C conductor (not shown) of repeater 201. The finding of battery on the C conductor of repeater 201 completes a circuit for operating relay 705 of selector 700; the circuit extending from battery over the test wiper 769, conductor C729, winding of relay 705, contacts 744 to ground. The operation of test relay 705 when an idle repeater, say 201 (Fig. 2), is found at contacts 707 opens the rotary magnet circuit, and at contacts 706 completes the circuit traced hereinbefore for operating switching relay 710, whereby the loop circuit is extended to repeater 201. The other switching functions of relay 710 also are similar to those described above for a call involving selector 700A.

Upon seizure of repeater 201 the next series of impulses dialled will be repeated by repeater 201 into incoming selector 105 (Fig. 1). Upon receipt of the dialled impulses incoming selector 105 will be operated to a level having access to connectors in exchange B. Assuming that connector 104 is seized, connector 104 will receive the remaining series of impulses to establish connection with substation T2, all as described above.

Assuming that substation T6 desires to call a substation such as T4 in exchange C, special second selector 700 upon being seized via the fourth level of selector 203 and upon receiving the digit "9" as the second digit dialled will be stepped to its ninth level in the manner previously described. Since level nine of selector 700 is multipled to level nine of incoming selector 600 (shown in Fig. 2), the remaining operation is identical to that disclosed under the heading "Outgoing Calls From Exchange B—Calling Station Is Non-Restricted," and need not be further described.

*Outgoing calls from exchange A—calling station is restricted*

Assuming that a restricted substation, such as T5 (Fig. 2) equipped with the special type dial, desires to communicate with the party at substation T1 in exchange B, the calling party upon removing his handset will be connected with a first selector such as 203 as described above.

The first digit dialled being the digit "4", selector 203 will receive the four impulses and operate its wipers to the fourth level. It will be recalled that the special dial at substation T5 sends a short ground pulse immediately after completion of each digit dialled. However, since selector 203 is of conventional design this ground pulse will have no effect on selector 203. At the end of the digit the switch wipers will rotate over the selected level in the usual manner in search of an idle special second selector. Assuming that special second selector 700 is seized, then selector 203 in switching through extends the loop to relays 720 and 725 in this selector. Differential relay 720 does not operate over the loop. Relay 725 in operating causes the operation of relay 730 which in turn operates relay 740 as previously described.

The next dialled digit being the digit "2", relay 725 will restore and reoperate two times to operate the wipers 767–769 to the second level in the manner previously described. However, at the end of the series of impulses the ground pulse transmitted from the special dial at substation T5 will short-circuit the lower windings of relays 720 and 725 over a circuit path extending by way of conductor C212, Fig. 2, the positive conductors of line circuit 200, finder 202 and selector 203, and C702 of selector 700 (Fig. 7), contacts 713, and the lower windings of relays 720 and 725 to ground, to operate differential relay 720, line relay 725 being maintained operated over its upper winding. Level two being a restricted level normal post contacts 704 are closed in the instant case, so that relay 750 operates and locks as described above. As explained above for a restricted call over incoming selector 700A release magnet 790 operates from ground at contacts 754 to restore the wipers to their normal position, thereby opening the V.O.N. spring contacts 786. Relay 770 accordingly releases to restore release magnet 790 and permit relay 760 to operate and lock and cause the reoperation of relay 770.

With contacts 764 and 776 thus closed rotary magnet 795 will thus rotate wipers 767, 768, and 769 over the normal level of the switch in search of an idle operator's trunk. When an idle operator's trunk circuit, such as 206 (Fig. 2), is found idle, battery will be received therefrom over test wiper 769 to operate test relay 705. At contacts 707 the rotary magnet circuit accordingly is opened, and at contacts 706 the circuit of switching relay 710 completed. Relay 710 at contacts 712 and 713 extends the talking circuit to the operator's trunk in the manner previously described. The operator at switchboard 207 will answer the call thus diverted to her and will then handle it as circumstances may require.

Assuming that the party at substation T5 attempts to call a substation such as T4 in exchange C the calling subscriber dials "9" as the second digit, thereby raising the wipers of selector 700 to its ninth level. Since this is a non-restricted level the normal post springs will not operate so that the ground pulse transmitted after the second series of impulses will have no effect. As a result the call will be completed over level nine in the same manner as described above for a corresponding call from substation T6.

It is not considered necessary to describe in detail how a subscriber in any of exchanges A, B or C may automatically establish a local connection to another subscriber in his own office as the corresponding trunking will be evident from an inspection of Figs. 1 and 2. It will suffice to point out that local connections in the main exchange A involve the fifth level of selector 700 and that since restrictions are, of course, not required on local calls, normal post springs 704, Fig. 7, are not arranged to be actuated at this level.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. In a telephone system, a numerical switch of the trunk-hunting type having wipers and a plurality of groups of bank contacts, outgoing trunks connected to said contacts, a trunk incoming to said switch and including a pair of line conductors, subscriber dial means for transmitting a series of numerical loop impulses to said switch over said conductors, other means in said subscriber dial means for transmitting a ground pulse to said switch over said conductors immediately after the transmission of said loop impulses, a line relay and a differential relay connected to said conductors in said switch, said line relay being responsive to said loop impulses to cause said wipers to be positioned opposite one of said groups of bank contacts and said differential relay being operated in response to said ground pulse directly received over said conductors from said other means, means in said switch automatically operative at the end of said series of loop pulses to search for and seize an idle one of said outgoing trunks by way of said wipers, and means in said switch responsive only in case said differential relay is operated in response to the receipt of said ground pulse transmitted by said other means in said subscriber dial means after seizure of said switch for momentarily grounding said seized outgoing trunk.

2. In a telephone system, a restricted and a non-restricted substation, a numerical switch of the trunk-hunting type having wipers and a plurality of groups of bank contacts, outgoing trunks connected to said contacts, said non-restricted substation having a calling device provided with impulse contacts, said restricted substation having a calling device provided with impulse contacts and auxiliary contacts, a line relay and a differential relay in said switch, means for extending connections including a pair of line conductors between each of said substations and said pair of relays, said impulse contacts being intermittently operated during the return movement of the calling device at said substation following actuation of said device, said line relay being responsive to the operation of said impulse contacts to cause said wipers to be positioned opposite one of said groups of bank contacts, said auxiliary contacts, in the case of a call from said restricted substation being closed after reclosure of said impulse contacts after the last digital impulse but before return of said calling device to normal to ground said conductors momentarily, said differential relay operating responsive to said grounding, means in said switch automatically operative at the end of said series of impulses to search for and seize an idle one of said outgoing trunks by way of said wipers, means in said switch being effective in response to said seizure of said outgoing trunk and only in case said differential relay is operated for momentarily grounding said seized outgoing trunk, and means at the far end of said seized outgoing trunk operated responsive to said grounding of said trunk for marking the far end of said seized outgoing trunk as a restricted call from said restricted substation.

3. In a telephone system, the combination as claimed in claim 2, including a two-motion numerical switch at said far end of the outgoing trunk, said two-motion switch having a set of wipers and sets of bank contacts disposed in a plurality of off-normal levels and a normal level, trunks to an operator being connected to said normal level, a differential relay in said two-motion switch connected to said seized outgoing trunk and operated under control of said restricted ground marking, and means in said two-motion switch operated in response to the operation of said differential relay for automatically moving said wipers over the bank contacts of said normal level in search of an idle one of said operator trunks.

4. In a telephone system an incoming trunk, an outgoing trunk, each including a pair of line conductors, an impulse repeater terminating said pair of line conductors of said incoming trunk and connected to said pair of line conductors of said outgoing trunk and having a line relay and a differential relay connected in series relation to said incoming pair of line conductors, there being provided means at the calling end of said incoming trunk means for transmitting to said repeater a series of digital loop impulses and means for transmitting to said repeater a ground pulse over said incoming line conductors, said differential relay being responsive to said ground pulse to repeat said ground pulse over said pair of outgoing conductors only in case said ground pulse is received prior to the receipt of said digital loop impulses, and means in said repeater controlled by the operation of said differential relay for determining the length of said repeated ground pulse.

5. In a telephone system, a substation having a calling device for transmitting series of digital impulses; a numerical switch having a pair of incoming line conductors, a set of wipers, and sets of bank contacts disposed in a plurality of off-normal levels and a normal level accessible to said wipers; means for extending a connection from said substation to seize said switch over said line conductors, an impulse responsive relay in said switch operated over said conductors in response to the receipt of the impulses of a digit transmitted by said calling device after completion of said connection, primary driving means in said switch operated by said impulse responsive relay for operating said wipers in a primary direction to select one of said off-normal levels of bank contacts corresponding to the number of impulses in the received digit, secondary driving means for operating said wipers in a secondary direction, change-over means operated responsive to the seizure of said switch and during said primary movement for disabling said secondary driving means, said change-over means automatically restored in response to the termination of said digit transmission to enable said secondary driving means to operate said wipers over the selected off-normal level bank contacts, means for grounding one of said line conductors after seizure of said switch and prior to the receipt of digital impulses, a differential relay connected to said line conductors and operated responsive to said grounding of said one line conductor, means controlled by the operation of said differential relay for disabling said primary driving means to prevent any primary movement of said wipers and for enabling said secondary driving means to operate said wipers over the normal level bank contacts.

6. In a telephone system; a numerical switch having a pair of incoming line conductors, a set of wipers, and sets of bank contacts disposed in a plurality of off-normal levels and a normal level accessible to said wipers; an impulse responsive relay in said switch connected to said conductors, means for seizing said switch and for initially operating said impulse responsive relay over said line conductors, a change-over relay in said switch, means responsive to the initial operation of said impulse responsive relay for operating said change-over relay, sending means operated after seizure of said switch for transmitting a series of numerical loop pulses over said line conductors to intermittently operate said impulse responsive relay a number of times corresponding to the number of loop pulses in said series, a first driving means in said switch operated by said intermittent operation of said impulse responsive relay for moving said wipers in a primary direction to select one of said off-normal level of bank contacts, a second driving means for driving said wipers in a secondary direction in any one of said levels, means for restoring said change-over relay after termination of said series of loop pulses for effecting a transfer from said first to said second driving means to enable said second driving means to move said wipers over the bank contacts of any selected off-normal level in search of an idle outgoing trunk, means in said sending means for transmitting a ground pulse over said line conductors to said switch, a differential relay in said switch connected to said line conductors and operated by said transmitted ground pulse, and means in said switch controlled responsive to the operation of said differential relay in case said differential relay is operated by said ground pulse prior to the receipt of said series of loop pulses for operating said second driving means immediately to drive said wipers over the normal level bank contacts in search of a different idle outgoing trunk.

7. In a telephone system, a restricted substation having a calling device for transmitting series of digital impulses; a numerical switching having a pair of incoming line conductors, a set of wipers, and sets of bank contacts disposed in a plurality of off-normal levels and a normal level accessible to said wipers; means for extending a loop circuit from said substation over said conductors to seize said switch, means including an impulse relay in said switch intermittently operated over said conductors in response to said calling device being operated to transmit a series of digital impulses for operating said wipers to select an off-normal level of bank contacts corresponding to the number of impulses in said transmitted series, stepping means in said switch operated after the selection of said off-normal level for automatically operating said wipers over the bank contacts of said selected level in search of an idle outgoing trunk, means at said calling device effective after transmission of said series of digital impulses for momentarily transmitting a ground impulse over said conductors, a differential relay in said switch operated by said ground impulse transmitted over said conductors, one of said off-normal levels being a restricted level, restricting means in said switch operated in response to said wipers being operated to select said restricted level, releasing means in said switch responsive to the operation of said differential relay only in case said restricting means is operated for restoring said switch wipers to said normal level, intercepting trunks terminating in said normal level bank contacts, said stepping means automatically effective after restoration of said wipers to said normal level for operating said wipers over the normal level bank contacts in search for an idle intercepting trunk.

References Cited in the file of this patent

UNITED STATES PATENTS

| | | |
|---|---|---|
| 2,410,520 | Ostline | Nov. 5, 1946 |
| 2,535,509 | Ostline | Dec. 26, 1950 |
| 2,544,944 | Wicks | Mar. 13, 1951 |
| 2,614,174 | Balzer et al. | Oct. 14, 1952 |
| 2,708,690 | Mitchell | May 17, 1955 |
| 2,759,048 | Lomax | Aug. 14, 1956 |